(12) United States Patent
Chen

(10) Patent No.: US 10,530,422 B2
(45) Date of Patent: Jan. 7, 2020

(54) BEHAVIOURAL CIRCUIT JITTER MODEL

(71) Applicant: International Business Machines Corporation, Armonk, NY (US)

(72) Inventor: Zhaoqing Chen, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 610 days.

(21) Appl. No.: 15/047,011

(22) Filed: Feb. 18, 2016

(65) Prior Publication Data
US 2017/0244504 A1     Aug. 24, 2017

(51) Int. Cl.
*H04B 3/46* (2015.01)

(52) U.S. Cl.
CPC ..................... *H04B 3/46* (2013.01)

(58) Field of Classification Search
CPC .... H04B 17/3912; H04B 3/46; H04L 27/0002
See application file for complete search history.

(56) References Cited

U.S. PATENT DOCUMENTS

| | | | | |
|---|---|---|---|---|
| 3,930,209 A * | 12/1975 | Popick | ...................... | H04B 3/40 327/285 |
| 4,263,593 A * | 4/1981 | Dagostino | ............ | G01R 13/345 315/367 |
| 6,285,197 B2 * | 9/2001 | Walker | ..................... | H04L 1/205 324/603 |
| 7,010,768 B2 * | 3/2006 | Dahlen | ............... | G06F 17/5036 703/14 |
| 7,412,005 B2 | 8/2008 | Wang et al. | | |
| 8,327,204 B2 * | 12/2012 | Hafed | .............. | G01R 31/31709 714/700 |
| 8,552,783 B2 * | 10/2013 | Rylov | .................. | H03H 11/265 327/276 |

(Continued)

FOREIGN PATENT DOCUMENTS

WO     2006063361 A2     6/2006

OTHER PUBLICATIONS

Quaries. "Spice3 Version 3C1 Users Guide" Memorandum No. UCB/ERL M89.46 (1989), pp. 1-20, 71-80 [retrieved on Apr. 24, 2018]. Retrieved from <https://www2.eecs.berkeley.edu/Pubs/TechRpts/1989/ERL-89-46.pdf>.*

(Continued)

*Primary Examiner* — Rehana Perveen
*Assistant Examiner* — Alfred H B Wechselberger
(74) *Attorney, Agent, or Firm* — Cantor Colburn LLP; Tihon Poltavets

(57) ABSTRACT

A method of analyzing a transient response of an electronic circuit includes receiving at a jitter modulator circuit first and second input signals, modulating the second input signal on the first input signal in the jitter modulator circuit and outputting a modulated signal based on the first and second input signals. The jitter modulator circuit includes models of N parallel connected transmission lines and modulating includes providing the first input signal, at each of a series of times t, to the N transmission line models and selecting an output of two of the N transmission line models based on the second input. The modulated signal is formed based on the selected outputs of the two N transmission lines models.

9 Claims, 6 Drawing Sheets

(56) References Cited

U.S. PATENT DOCUMENTS

| | | | |
|---|---|---|---|
| 8,605,566 B2* | 12/2013 | Schmukler | H03H 11/265 370/201 |
| 8,670,969 B1 | 3/2014 | Kundert | |
| 8,904,331 B1 | 12/2014 | Fung | |
| 2006/0050827 A1* | 3/2006 | Saeki | H03M 9/00 375/362 |
| 2006/0280239 A1* | 12/2006 | Moll | G01R 31/31928 375/224 |
| 2008/0054966 A1* | 3/2008 | Tamura | H03K 3/0322 327/158 |
| 2009/0158100 A1* | 6/2009 | Sawara | G01R 31/31709 714/700 |
| 2009/0319065 A1 | 12/2009 | Risbo | |
| 2012/0223732 A1* | 9/2012 | Kobayashi | G01R 35/005 324/756.03 |
| 2013/0243138 A1 | 9/2013 | Jiang et al. | |
| 2014/0074446 A1 | 3/2014 | Hollis | |
| 2014/0107997 A1* | 4/2014 | Li | G06F 17/5009 703/13 |

OTHER PUBLICATIONS

Hauenschild et al. "Influence of Transmission-Line Interconnections Between Gigabit-per-Second IC's on Time Jitter and Instabilities" IEEE Journal of Solid-State Circuits, vol. 25, No. 3 (1990) [retrieved on Apr. 20, 2018]. Retrieved from <https://ieeexplore.ieee.org/document/102673>.*

Kim et al. "Analysis and Simulation of Jitter Sequences for Testing Serial Data Channels" IEEE Transactions on Industrial Informatics, vol. 4, No. 2 (2008) [retrieved on Apr. 20, 2018]. Retrieved from <https://ieeexplore.ieee.org/document/4526708>.*

Fitzpatrick, D. "Analog Design and Simulation using OrCAD Capture and PSpice" Elsevier, p. 138 [retrieved on Apr. 23, 2018]. Retrieved from STIC. (Year: 2012).*

Yamaguchi et al. "Effects of Deterministic Jitter in a Cable on Jitter Tolerance Measurements" ITC International Test Conference, Paper 3.2 [retrieved on Aug. 12, 2019]. Retrieved from <https://ieeexplore.ieee.org/stamp/stamp.jsp?arnumber=1270825> (Year: 2003).*

Alpert, Andreas, "Jitter Measurements in Telecom Transmission Systems—Improving Accuracy and Repeatability", JDSU, 2014, 18 pages.

Bockelman et al., "Combined Differential and Common-Mode Scattering Parameters: Theory and Simulation", IEEE Transactions on Microwave Theory and Techniques, vol. 43, No. 7, Jul. 1995, pp. 1530-1539, 10 pages.

Chen, Zhaoqing "Linear Circuit Model Combination for Coupled Noise Simulation by Using Directional Junction", IEEE 14th Topical Meeting on Electrical Performance of Electronic Packaging, Oct. 2005, pp. 83-86, 4 pages.

Chen, Zhaoqing "Packaing System S-Parameter Model Decomposition and On-Demand Composition Using Directional Junctions for Signal Integrity Transient Simulation", 59th Electronic Components & Technology Conference, May-Jun. 2009, pp. 1964-1969, 6 pages.

Demir et al., "Behavioral Simulation Techniques for Phase/Delay-Locked Systems", IEEE 1994 Custom Integrated Circuits Conference, 1994, 4 pagse.

List of IBM Patents or Patent Applications Treated as Related; Date File: Feb. 18, 2016, pp. 1-2.

National Instruments, "Understanding and Characterizing Timing Jitter", www.ni.com, Apr. 17, 2013, 19 pages.

Pupalaikis, Peter J. "Validation Methods for S-parameter Measurement Based Models of Differential Transmission Lines", LeCroy Corporation, 2008, 25 pages.

Rao et al., "Analysis of Jitter-Induced Voltage Noise in Clock Channels", IEEE Transactions on Electromagnetic Compatibility, vol. 57, No. 4, Aug. 2015 pp. 788-795, 8 pages.

Rao et al., "Frequency Domain Analysis of Jitter Amplification in Clock Channels", in Proc.,2012, EPEPS, pp. 51-54, 4 pages.

Rao et al., "Mechanism of Jitter Amplification in Clock Channels", Keysight Technologies, DesignCon 2014, 24 pages.

Xia et al., "Timing Jitter Characterization for Mixed-Signal Production Test Using the Interpolation Algorithm", IEEE Transactions on Industrial Electronics, vol. 54, No. 2, Apr. 2007, pp. 1014-1023, 10 pagse.

Zhaoqing Chen, "A Single-Ended-Mode to Mixed-Mode Transformer Spice Circuit Model for High-Speed System Signal Integrity Simulations", U.S. Appl. No. 15/047,002, filed Feb. 18, 2016.

Zhaoqing Chen, "Data Clocked Retimer Model", U.S. Appl. No. 15/047,152, filed Feb. 18, 2016.

Zhaoqing Chen, "Reference Clocked Retimer Model", U.S. Appl. No. 15/047,143, filed Feb. 18, 2016.

* cited by examiner

BEHAVIOURAL CIRCUIT JITTER MODEL

BACKGROUND

The present invention relates to electronic circuits, and more specifically, to systems and methods for designing and analyzing the transient response of an electronic circuit.

Advances in the field of computer and electronic system design continue to drive and facilitate greater processing efficiencies. Through modeling and other analysis, electronic files containing designs for electronic circuits and computer systems are optimized for use as templates for hardware manufacturing and networking.

A typical computer/circuit design file includes text that accounts for numerous electronic hardware components. For example, a file containing a design commonly includes programmatic objects and identifiers descriptive of busses, microchips, expansion cards and other system hardware. A bus generally enables selective communication between a computer processor unit (CPU) and one or more components, such as those mounted on an expansion card. A typical bus, such as a Peripheral Component Interconnect or Industry Standard Architecture bus, may additionally couple to a main system circuit board. Expansion cards are typically thin, rectangular printed circuit boards that have connector pins along one edge that couple to corresponding sockets of the bus. Programmatic objects describing such components within the design file may include delay, routing, voltage, resistance, symbol and/or other parameter data.

In operation, actual components of a circuit cooperate to process electronic signals according to system requirements. More particularly, the components interconnect to generate and communicate electronic signals. Different combinations and configurations of components affect system performance. For example, component layout can impact system timing. System timing regards the arrival of a signal at a given component within a predetermined window of time. Each component visited along the path of a signal introduces varying delay that affects the time required for the signal to reach a destination component. Thus, successful timing requires coordination with other signals and signal paths to ensure coordinated system processing. Failure to achieve desired timing can result in processing delays, error and failure. For instance, a system function that conjunctively processes multiple signals cannot complete its processing until the last of the signals arrives. Thus, the function can be unduly delayed or altogether frustrated should an unacceptable amount of time lapse while waiting for the last of the signals to arrive. For example, delays may cause race conditions, where a process may shutdown altogether in response to a late signal.

Another performance factor affected by system design is noise. Noise is characterized as static or interference introduced as the signal travels through system components and connections. As such, the electrical characteristics of the signal change as it propagates through a system. For instance, square wave characteristics of an input signal may become less distinct due to loss dispersion encountered in a system. While some tolerance of noise is typically built into a system design specification, unacceptable noise levels can severely impact signal clarity and system performance. For example, data may become corrupted, e.g., a binary "1" may register as a "0."

Production of a hardware system represents a substantial investment of material, manpower and other economic resources. Consequently, it is advantageous to verify design integrity prior to committing it to hardware. More particularly, it is desirable to predict or otherwise analyze performance characteristics of a design prior to implementation. To this end, simulation programs, or engines, have been developed to model performance of the programmatic objects of a design. Such modeling practices help to assure conformity with system needs.

SUMMARY

According to an embodiment of the present invention, a method of analyzing a transient response of an electronic circuit is disclosed. The method includes: receiving at a jitter modulator circuit first and second input signals; modulating the second input signal on the first input signal in the jitter modulator circuit; and outputting a modulated signal based on the first and second input signals. In this embodiment, the jitter modulator circuit includes models of N parallel connected transmission lines and modulating includes providing the first input signal, at each of a series of times t, to the N transmission line models and selecting an output of two of the N transmission line models based on the second input. In this embodiment, the modulated signal is formed based on the selected outputs of the two N transmission lines models.

According to an embodiment of the present invention, a computer program product comprising a computer readable storage medium having program instructions embodied therewith is disclosed. The program instructions are executable by a processor chip to cause the processor chip to analyze a transient response of an electronic circuit by: receiving at a jitter modulator circuit first and second input signals; modulating the second input signal on the first input signal in the jitter modulator circuit; and outputting a modulated signal based on the first and second input signals. In this embodiment, the jitter modulator circuit includes models of N parallel connected transmission lines and modulating includes providing the first input signal, at each of a series of times t, to the N transmission line models and selecting an output of two of the N transmission line models based on the second input. In this embodiment, the modulated signal is formed based on the selected outputs of the two N transmission lines models.

According to an embodiment of the present invention a system for analyzing a circuit is disclosed. The system includes a signal source, a jitter source and a jitter modulator circuit that receives a first input signal from the signal source and a second input signal from the jitter source. The jitter modulator circuit modulates the second input signal onto the first input signal and outputs a jitter modulated signal based on the first and second input signals. In this embodiment, the jitter modulator circuit includes models of N parallel connected transmission lines and it modulates the second signal on to the first signal by providing the first input signal, at each of a series of times t, to the N transmission line models and selecting an output of two of the N transmission line models based on the second input. In this embodiment, the jitter modulated signal is formed based on the selected outputs of the two of the N transmission lines models.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As the clock frequency increases rapidly, the effect of jitter to the high-speed package system signal integrity becomes more and more important. Accurate signal integrity simulations need accurate and simple models and simulations to include the jitter effect. Many new progresses in jitter measurement and frequency domain jitter transfer function study can be found in the literature.

The jitter transfer function, which can cover both packaging and the receiver or retimer clock and/or data recovering, is very useful for analyzing jitters in the packaging system signal integrity (SI) simulation. Such transfer functions provide an output that is time varying value of the amount of jitter that a jitter source imparts to a particular circuit. That is, the output of such transfer functions may be, for example, a sign wave that tells defines an amount (e.g., a time) by which a particular signal will be varied. Thus, just combing these two signals will not provide an accurate representation of how the jitter will affect the output signal. To add or inject a known jitter time-domain waveform into a data stream voltage waveform would prove useful and convenient for the packaging system eye diagram simulation and display. The jitter modulator circuit model described below provides a means of combining the jitter values with the output of the circuit model to form a "jittered" signal. In many cases herein, the circuit model will be shown as providing a so-called "eye" diagram. It shall be understood that the signal could be different but for testing purposes eye diagram have proved useful.

Figure 1:
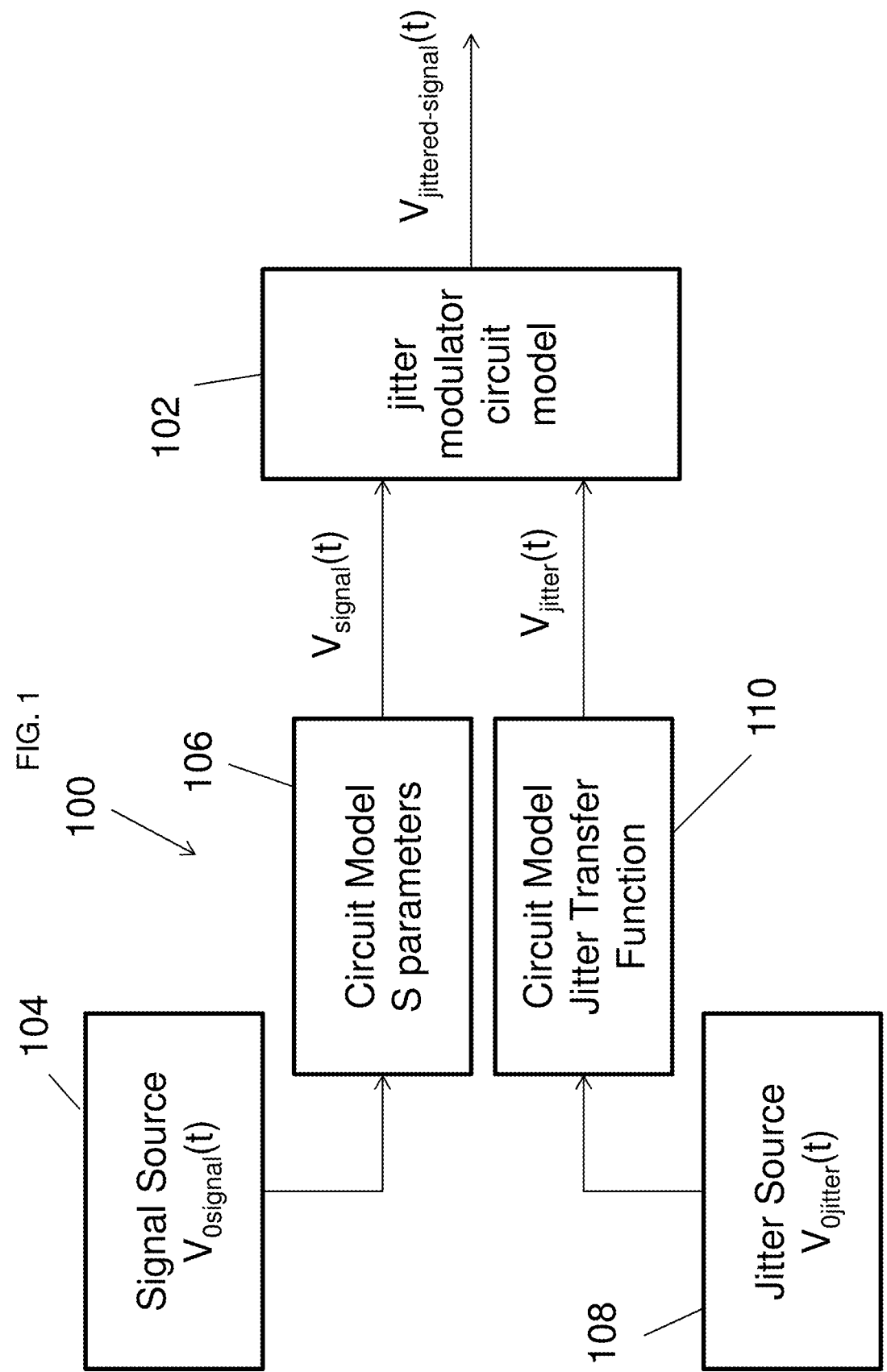
FIG. 1 is a functional block diagram of a system according to one embodiment.

FIG. 1 shows an example of system in which 100 in which a jitter modulator circuit model 102 according to one embodiment may be utilized. This model may be referred to from time to time as the jitter modulator herein.

It shall be understood that the jitter modulator 102 may be implemented in a behavioral circuit modeling program. SPICE (Simulation Program with Integrated Circuit Emphasis), HSPICE, POWERSPICE, or IBIS (I/O Buffer Information Specification) circuit models are examples of such programs.

The system 100 includes a signal source 104 that generates an input signal $V_{0signal}(t)$. The source signal may be any source input signal. For testing purposes, the signal source may be string of single bits that vary 0101 . . . . Such a stream of bits may be shown, for example, as a square wave. This signal is provided to an S-parameter circuit model 106. Scattering parameters or S-parameters (the elements of a scattering matrix or S-matrix) describe the electrical behavior of electrical networks when undergoing stimuli by electrical signals. As is known, many circuit properties may be expresses in terms of S-parameters including gain, return loss, SWR etc. The S-parameter circuit model may be single ended mode to mixed mode or from mixed mode to single ended mode.

Consider to example, the case of connection between two elements through a connection such as a Serial/Desserializer (SerDer). It shall be understood that passing a data signal through the SERDES may introduce noise or other anomalies into the input signal and degrade the signal. The model 106 may be model that includes the elements of such a SerDes. Of course, the model could be of any type of circuit. An ideal circuit would exactly reproduce the input signal $v_{0signal}(t)$. This, however, does not happen and the circuit model provides a different output that is based on the input and is shown in FIG. 1 as $v_{signal}(t)$. $v_{signal}(t)$ is a time domain signal that represent the output of the modeled circuit as determined, for example, by any of the modeling programs described above. Of course, other models than those previously known could also be used. As will be understood, the transitions from 0 to 1 to 0 either as a time series or the transitions can be overlayed to from a so-called "eye diagram."

Figure 2:
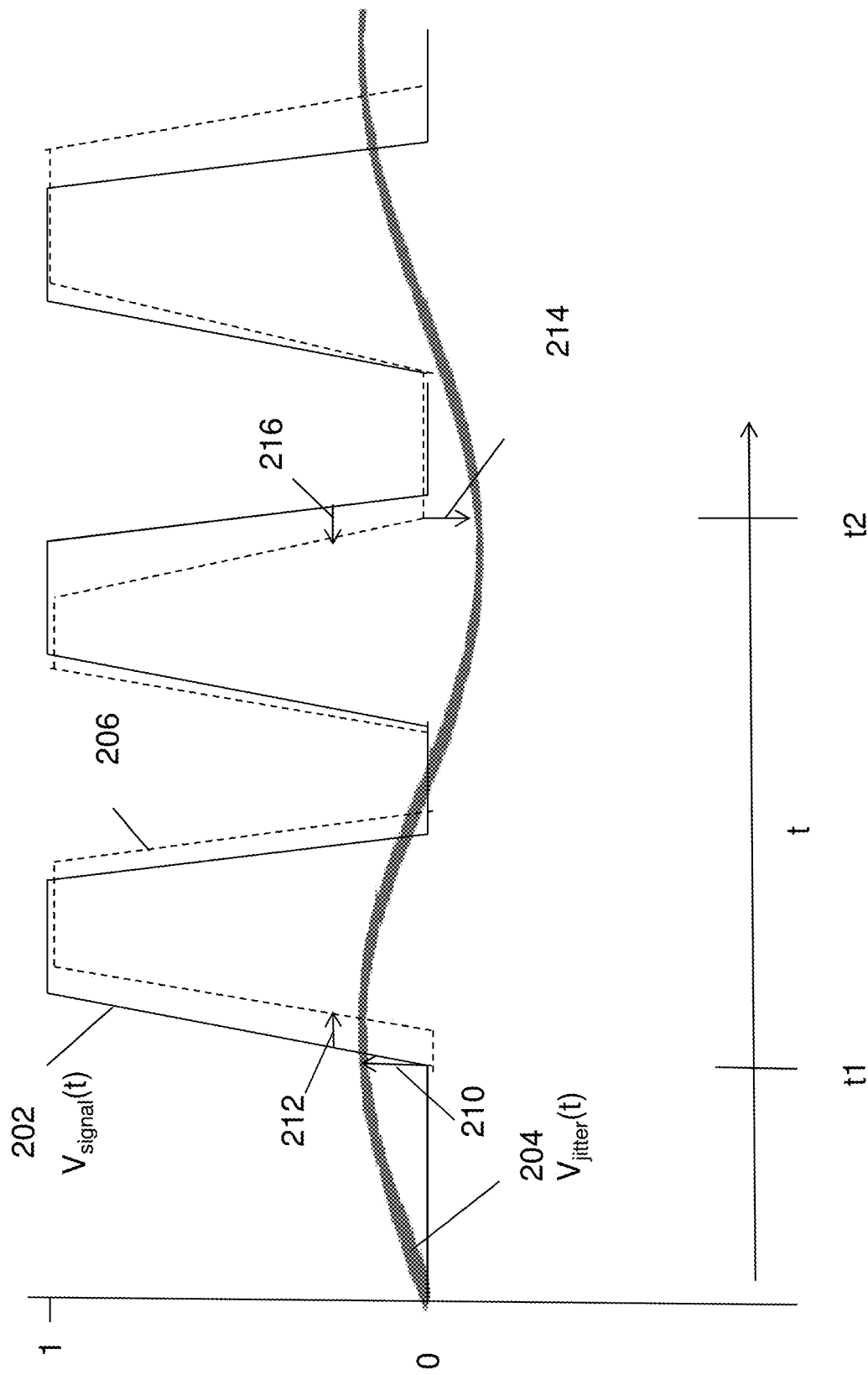
FIG. 2 shows the shifting in time of a signal due to jitter according to one embodiment.

FIG. 2 shown an example of $v_{signal}(t)$ represented as trace 202. Such a signal may be the output, for example, of a circuit model of a Serdes. Another type of element that may provide such an output is a so-called retimer. A retimer receives an input and provides a new version of the same signal at a same frequency. In FIG. 2, the units in the x direction related to trace 202 are in time and the vertical axis measures amplitude in voltage.

Now referring again to FIG. 1, assume that possible sources of jitter may be introduced into circuit being modeled by model 106. The voltage vsignal(t) include—the jitters generated in model 106 such as those by the intersymbol interference, cross talk, and the like. Other jitter sources such as low frequency periodic jitter which may be caused by EMI should be generally included in a jitter source 108 and it produces a jitter signal $v_{0jitter}(t)$. At present the above simulation programs may include the ability to determine how the jitter signal may affect the circuit. Such may be performed by a circuit model jitter transfer function 110. This model is different from the circuit model 106. In one embodiment, the jitter transfer model considers only one part of the two jitter parts, the part does not go through an S-parameter model. The output of such models is a time varying signal that represents how much the jitter source will vary the output of the particular circuit. In FIG. 2, the output ($v_{jitter}(t)$) of the a circuit model jitter transfer function 110 is shown by trace 204. The particular shape of the trace 204 is not limited to that shown in FIG. 2 and can be any shape. The "value" on the vertical axis related trace 204 represents the amount that jitter may cause the signal $v_{signal}(t)$ to be altered. Trace 204 and 202 as shown both have voltage as their units on the x axis although the physical reality of trace 204 is the jitter with a time unit.

At present, there is no system or simulation that combines these two values in a simulation in a meaningful way. To provide a time domain jitter modulator that overlays trace 204 onto the digital data stream (trace 202; $v_{signal}(t)$ will be very useful and convenient to signal integrity simulations. The model may be implemented into programs such as shown above to provide more accurate circuit analysis that takes into account jitter. Such information will allow for overlaying jitter into a circuit analysis and then determining if the circuit is resilient in the context jitter and if not, notify a user that redesign is required. This may provide the ability to predict or otherwise analyze performance characteristics of a design prior to implementation.

To that end, system 100 includes a jitter modulator 102 that modulates trace 204 onto trace 202 in a meaningful way.

Herein the modulated signal shall be referred to as $v_{jittered\text{-}signal}(t)$ or $v_{js}(t)$ for short. An example of $v_{js}(t)$ is shown as trace 206 in FIG. 2. For purposes of understanding, before an example of the processes performed by the jitter modulator 102 may be implemented, a step wise discussion of how $v_{js}(t)$ may be formed from traces 202 and 204 is provided.

As discussed above, trace 204 provides, for each time (t), a value in units of time that the jitter will cause trace 202 to be shifted. The shift can be either positive or negative depending on whether the amplitude of trace 204 is greater or less than zero. As such, the discussion below will account for negative shifting as will be understood by the skilled artisan based on the disclosure herein.

At a first time (t1) the value of 204 indicates that trace 202 should be shifted to the right by a time that is equal in magnitude to arrow 210. This shift is shown by arrow 212 and the resultant shifted signal is shown by trace 206 in FIG. 2. However, it shall be understood that a conversion factor (C) may be needed to convert from the voltage represented by trace 204 to a time shift represent by arrow 212. To that end, and as repeated below, the amplitude of trace 204 may be converted to units of time by multiplying by C which, in one embodiment, has units of s/V and in a particular embodiment has units of 1 ns/V. It shall be understood that the shifted signal is not shifted the same amount as indicated by arrow 212 at all points but may be shifted different amounts depending on the magnitude of trace 204 at any given time. For instance, at time t2, trace 204 indicates that trace 202 should be shifted to the left (e.g., trace 204 has a negative time value) as indicated by arrows 214 and 216. It shall be understood that at each possible time, the same process may be repeated to cause the effects of $v_{jitter}(t)$ to be applied to $v_{signal}(t)$ to form $vj_s(t)$.

The process performed in the above, however, cannot be applied, in real time to a signal $v_{signal}(t)$ because there are instances where the signal is to be shifted back in time (e.g., at arrows 214/216) before the signal is received. Heretofore, the effects of a transient $v_{jitter}(t)$ has not been applied to a $v_{signal}(t)$ in such a manner that the total transient response can accurately be modeled. That is, the prior art does not include modules that can effectively modulate the jitter onto a signals (e.g., jitter modulate) as just described. As further described below, the jitter modulator 102 may utilize a model of a series of transmission lines to jitter modulate these signals. An example of particular model is now described. It shall be understood that model can be varied based on particular situations.

Figure 3:
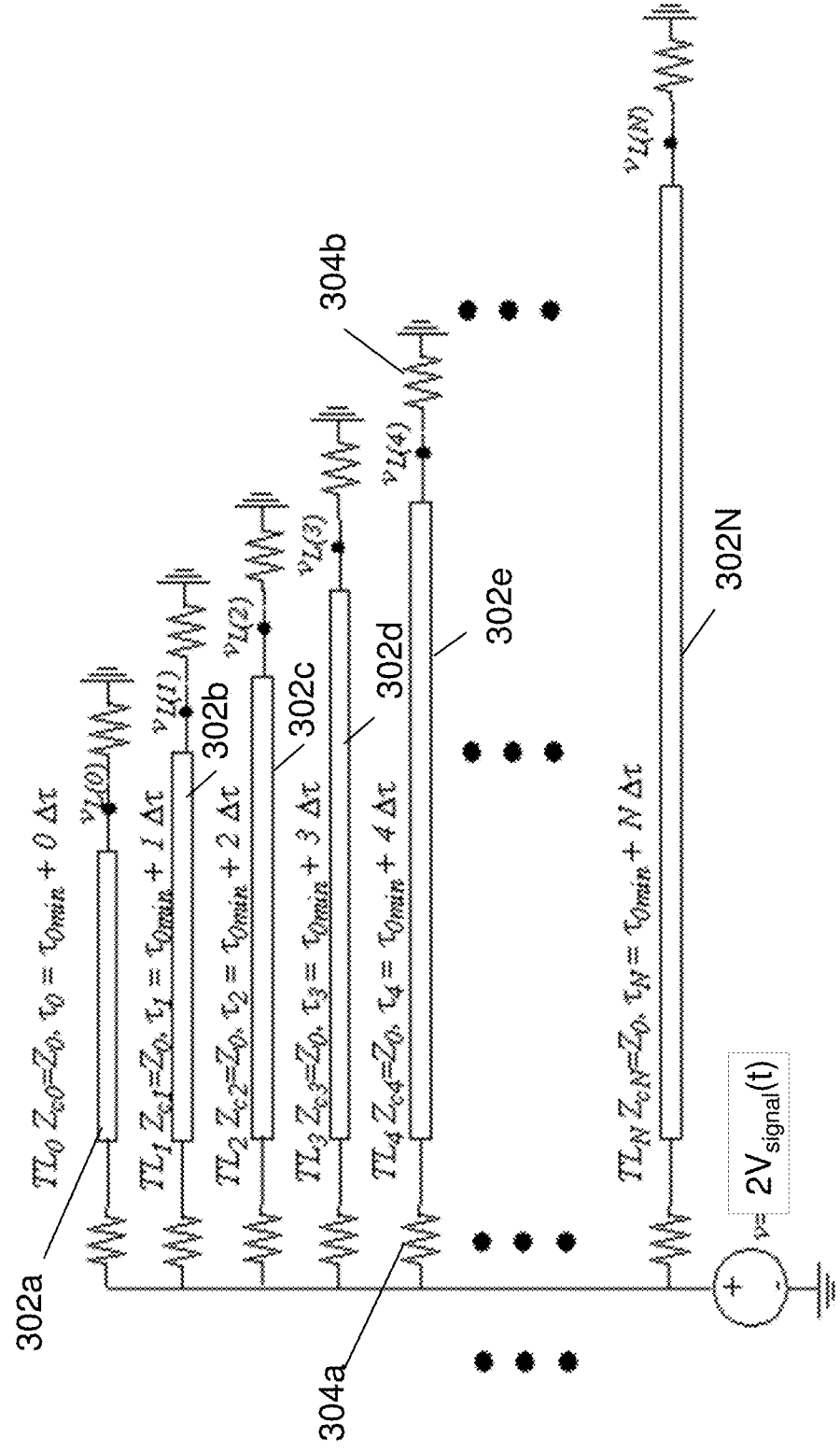
FIG. 3 a circuit diagram of a model that may be implemented as a jitter modulator according to one embodiment.

FIG. 3 schematically shows an example jitter modulator 102 according to one embodiment. The modulator 102 is formed of several different types of currently available elements in circuit simulators. In general, the modulator includes N ideal transmission lines 302a ... 302n connected in parallel. Each of these transmission lines receives an input signal equal to twice $v_{signal}(t)$. This is due to the fact that the output of each transmission line is divided by input and output resistors 304a, 304b that are included in the particular representation of an ideal transmission line shown in FIG. 3 and the fact that the output of these transmission lines is measured at the nodes labelled $v_L(n)$. Some background is informative.

As discussed above, it is difficult to modulate $v_{jitter}(t)$ on to $v_{signal}(t)$ because the jitter node voltage actually represents the jitter value in the time unit. The jitter injection or modulation can only be done by shifting the original signal voltage vsignal(t) in the time axis by the value of f(vjitter(t)) where f( ) is a linear scaling function from vjitter(t) with the unit of voltage to the real jitter Jitter(t)=f(vjitter(t)) with the unit of time. The jittered signal after the jitter injection or modulation can be described as vsignal(t-f(vjitter(t)) in post processing application. In the real-time transient simulation, for each time step at time t, an artificial delay $\tau_{0min}$ (where $f(v_{jitter}(t))+\tau_{0min}>0$) of the original signal is used to calculate the jittered signal at time $t-\tau_{0min}$ as the value of jittered signal at time t as described in Equation (1) below to avoid a negative value of a transmission line total delay:

$$v_{jittered\_signal}(t)=v_{signal}(t-(f(v_{jitter}(t))+\tau_{0min}))) \quad (1)$$

where $f(v_{jitter})=Cv_{jitter}$; V is the magnitude of v, and C is a constant as described above. From time to time herein, Jitter will be used as shorthand for $f(v_{jitter})$.

For any given time step k with circuit transient time tk, if a matched ideal transmission line (e.g, as shown in FIG. 3) with the time delay of $f(v_{jitter}(tk))+\tau_{0min}$ and put $v_{signal}(tk)$ at the one end of the transmission line, $v_{signal}(tk-(f(v_{jitter}(tk))+\tau_{0min})))$ emerges at the other end in real-time. However, due to computation constraints, a single transmission line model to cover every possible time delay of $f(v_{jitter}(tk))+\tau_{0min}$ is impractical. However, because in general case, Jitter(t)=f($v_{jitter}(t)$) can happen to be any value in a region Jmin<Jitter (t)<Jmax in the circuit transient simulation, interpolation to derive Jitter(t) based on two ideal transmission lines with fixed delays $\tau_{0min}+T1$ and $\tau_{0min}+T2$, where T1<=Jitter(t) <T2 may be utilized. The two transmissions lines will be an adjacent pair of lines shown in the model of FIG. 3.

For accurate interpolation, a small DT=T2-T1 is preferred. However, too small DT will reduce Jitter(t) coverage. To solve this problem, the model shown in FIG. 3 includes behavioral circuit including a group of N matched ideal transmission lines with a fixed DT for every two adjacent transmission lines. As further described below, an SGN function as a switch to select two adjacent transmission lines for interpolation to get a particular Jitter(tk).

Figure 4:
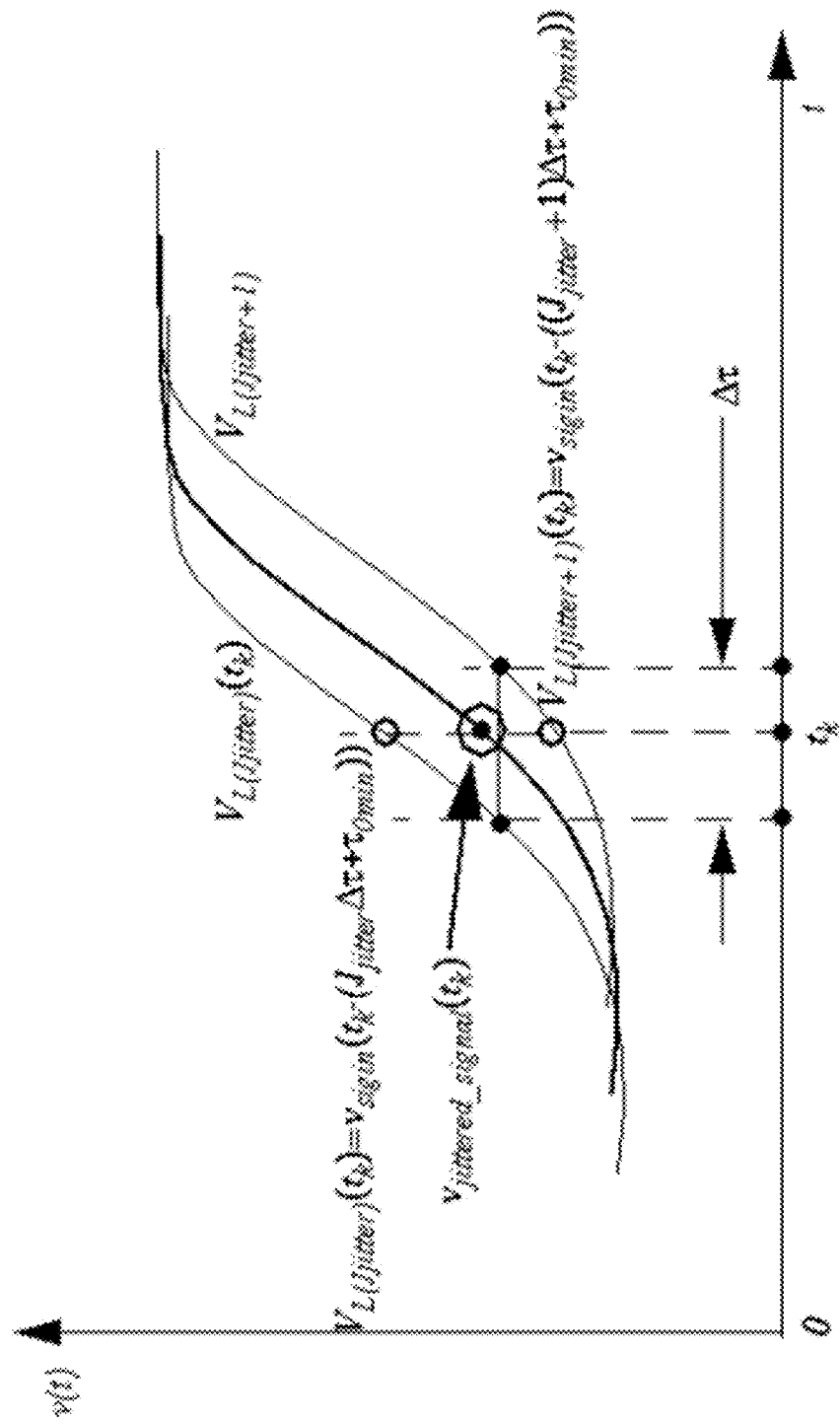
FIG. 4 shows how a signal may be interpolated from two of the transmission line outputs of the circuit of FIG. 3.

FIG. 4 shows an example of how a signal $v_{jittered\text{-}signal}$ (eg. the output of modulator 102) at time tk can be interpolated from the signals of two adjacent outputs from the model in FIG. 3. In particular, the outputs are the outputs $V_{L(Jitter)}(tk)$ and $V_{L(Jitter=1)}(tk)$.

The particular, pair of the transmission lines to be selected from the model of FIG. 3 may be selected as follows. First, the $\Delta\tau$ is defined to be $J_{max}-J_{min}/N$. Then, a conversion of the actual value (e.g., a voltage value) of $v_{jitter}$ is performed to create $j_{jitter}$ according to:

$$j_{jitter}=(f(v_{jitter})-J_{min})/\Delta\tau \quad (2)$$

At this point, an INT function may be applied to $J_{jitter}$ to convert it to an integer and that represents which of N transmission lines is to be selected. As discussed above, another transmission is to be selected. Whether it is the one above or below depends on whether the value of $J_{jitter}$ is positive or negative. The output of the two selected lines may then interpolated according:

$$V_{out} = V_{jitterered\_signal} =$$
$$2\left[\sum_{i=0}^{N-1}(P_{out(i)}(V_{L(i)}+(j_{jitter}-i)^*(V_{L(i+1)}-V_{L(i)}))+P_{out(N)}V_{L(N)}\right]$$

where:
$$P_{out(i)}=(1-|SGN(J_{jitter}-i)|)(i=0,1,2,\ldots,N)$$
$$SGN(x)=\begin{matrix}1(x>0)\\0(x=0)\\-1(x<0)\end{matrix}$$

Figure 5:
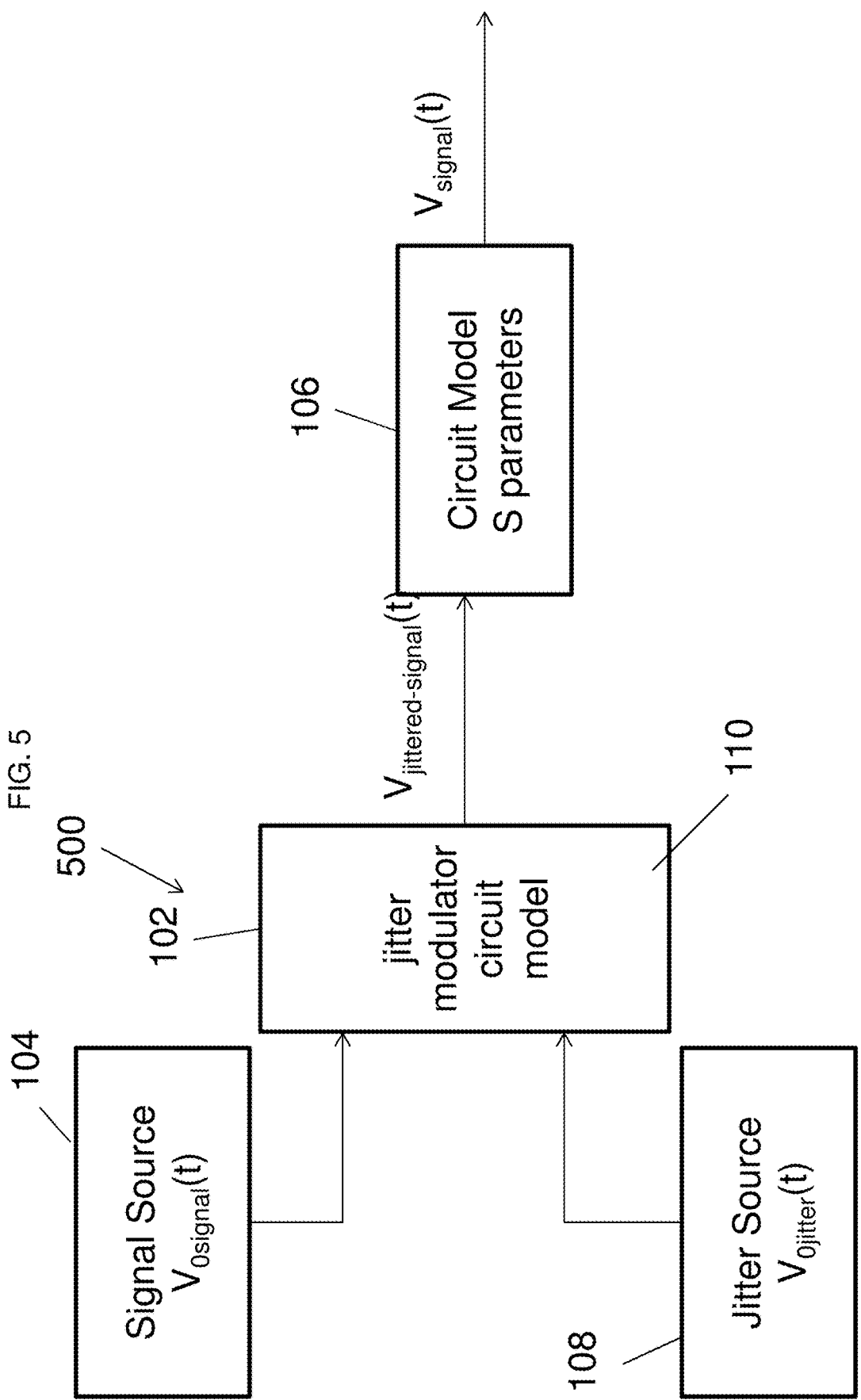
FIG. 5 is a functional block diagram of a system according to one embodiment.

The above description of operation of the jitter modulator 102 included the situation where it received inputs from two other models, the circuit s-parameter model 106 and the jitter transfer function 110. In another embodiment and as shown in FIG. 5, a circuit 500 may include a jitter modulator 102 that receives signals from other locations and modulates jitter onto a signal in the same manner. For example, the jitter modulator 102 be connected to the signal source 104 that generates an input signal $V_{Osignal}(t)$. The source signal may be any source input signal. As above, for testing purposes, the signal source may be string of single bits that vary 0101 . . . . Such a stream of bits may be shown, for example, as a square wave. If shall be understood that the circuits both FIGS. 1 and 5 are simplified examples and other elements may be included.

The jitter modulator 102 may also receive information describing a source of jitter. The sources include, for example, EMI or other electrical interference, cross talk, and the like. That source of jitter is generally shown a jitter source 108 and it produces a jitter signal $v_{Ojitter}(t)$. The jitter modulator 102 may combine (e.g., jitter modulate) the two signals in the manner described above to form an output $v_{jittered-signal}(t)$. This signal may then be provided to an S-parameter circuit model 106. As above, S-parameter model 106 converts this model to an output $v_{signal}(t)$. In this example, the jitter transfer function may be omitted as the signal provided to the model 106 already includes the jitter information in it.

Figure 6:
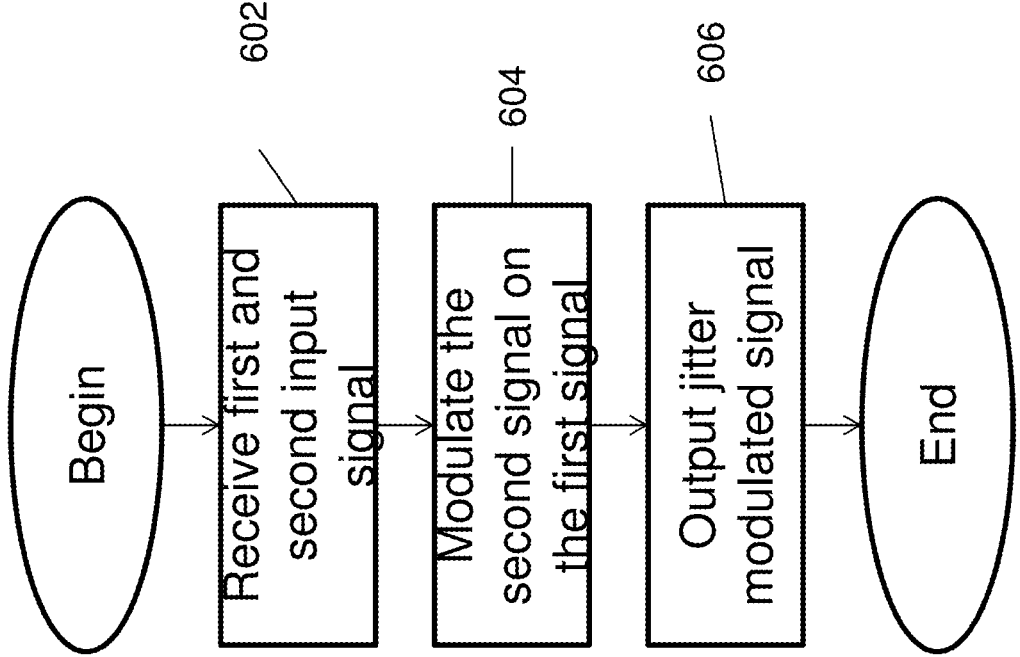
FIG. 6 is flow chart illustrating a method according to one embodiment.

FIG. 6 shows a method according to one embodiment. The method includes receiving at a jitter modulator circuit first and second inputs at block 602. In one embodiment, the first input is received from a signal source and the second input is received from a jitter source (as is shown, for example, in FIG. 5). In another embodiment, the first input is received from an s-parameter of a circuit and the second input is received from a jitter transfer model.

At block 604 the second input signal is modulated on the first input signal. Such modulation may include, for example, providing a modulator model that include N transmission lines as shown above. The model, more particularly, may include N ideal transmission lines that each impart a specific delay T to a signal and each line is separated by a same time delay difference DT from a neighboring transmission line. Based on a value of the second input, a first of the lines may be selected. The second may be selected as described above. The first signal may then be provided to the input of the two selected lines and the output values may provide interpolation bounds from which a jitter modulated signal is formed based on the first and second inputs. The process just described may, of course, may include any of the processing described above.

The signal that is jitter modulated in block 604 may be output at block 606.

The above description has included information related to how simulation models may be used. It shall be understood that the models may be used in the process of circuit design. That design may include forming an initial circuit design and then testing that design. The testing may including utilizing any of the circuits or circuit models disclosed herein. The results of the test may then be analyzed, either manually or automatically or by combination of both, to determine if the circuit "passed." This may include considering whether certain tolerances were exceeded. This may be done by, for example, comparing a threshold value to one or more of the outputs. For example, if certain timing requirements are not met or the circuit is too susceptible to cross-talk or jitter may determine if the circuit passed. In the event that the circuit does not pass, one or more of the circuit parameters may be changed and, in what turn out to be a repetitive cycle, the circuit is again tested. This may allow for circuit problems to be discovered and corrected before fabrication. Thus, in one embodiment, a method of forming a circuit is disclosed that includes forming and testing a first circuit model, changing the first circuit model to a second circuit model, optionally testing the second circuit model and providing the second circuit model to a production system or operation to create a physical circuit from some or all of the second circuit model.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of analyzing a transient response of an electronic circuit, the method comprising:
   receiving at a jitter modulator circuit a first input signal and a second input signal, the second input signal being a time varying signal wherein the jitter modulator circuit includes models of N parallel connected transmission lines, each of the transmission lines imparting a different amount of delay onto the first signal;
   modulating the second input signal on the first input signal in the jitter modulator circuit, wherein modulating includes selecting an adjacent two of the N transmission line models, wherein the adjacent two of the N transmission line models are selected based on a difference between a maximum and minimum voltage of the second signal;

outputting a modulated signal based on the first and second input signals; and determining if the electronic circuit has passed a test based on the modulated signal.

2. The method of claim 1, wherein modulating includes interpolation between values from the selected two outputs at each of the series of times t.

3. The method of claim 1, wherein the first input signal is received from a signal source model.

4. The method of claim 1, wherein the first input signal is received from an s-parameter model.

5. The method of claim 1, wherein the second input signal is received from a jitter source model.

6. The method of claim 1, wherein the second input signal is received from a jitter transfer model.

7. The method of claim 1, wherein at least one of the N transmission line models includes an ideal transmission line model.

8. The method of claim 1, wherein each of the N transmissions lines delays the first input signal an amount that is a fixed difference from an adjacent one of the N transmission lines.

9. A computer program product comprising a computer readable storage medium having program instructions embodied therewith, the program instructions executable by a processor chip to cause the processor chip to analyze a transient response of an electronic circuit by performing the method of claim 1.

* * * * *